United States Patent
Tsengas

(10) Patent No.: US 10,448,614 B1
(45) Date of Patent: Oct. 22, 2019

(54) ANIMAL FEEDER WITH REMOVABLE STORAGE WELLS

(71) Applicant: Steven Tsengas, Fairport Harbor, OH (US)

(72) Inventor: Steven Tsengas, Fairport Harbor, OH (US)

(73) Assignee: COSMIC PET LLC, Fairport Harbor, OH (US)

( * ) Notice: Subject to any disclaimer, the term of this patent is extended or adjusted under 35 U.S.C. 154(b) by 419 days.

(21) Appl. No.: 15/406,712

(22) Filed: Jan. 14, 2017

(51) Int. Cl.
*A01K 5/01* (2006.01)
*A01K 7/00* (2006.01)
*B65D 21/02* (2006.01)

(52) U.S. Cl.
CPC .............. *A01K 5/0114* (2013.01); *A01K 7/00* (2013.01); *B65D 21/0233* (2013.01)

(58) Field of Classification Search
CPC ...... A01K 5/0114; A01K 5/0128; A01K 7/00; A01K 5/0135; A01K 7/005; A01K 7/027; A01K 5/00; A01K 5/01; B65D 21/0233
USPC ............. 119/51.01, 61.5, 51.5, 61.52, 61.54, 119/61.56, 61.57, 72; 220/23.88
See application file for complete search history.

(56) References Cited

U.S. PATENT DOCUMENTS

| | | | | |
|---|---|---|---|---|
| 2,213,837 A * | 9/1940 | Gill | ......................... | A47G 19/02 126/246 |
| 3,349,941 A * | 10/1967 | Wanderer | ............. | B65D 43/021 206/514 |
| 3,653,362 A * | 4/1972 | Davis | ................... | A01K 5/0128 119/61.5 |
| 4,691,664 A * | 9/1987 | Crowell | .................... | A01K 7/00 119/61.52 |
| 4,699,089 A * | 10/1987 | Teschke | ............... | A01K 5/0114 119/51.5 |
| 5,709,168 A * | 1/1998 | Walker | ..................... | A01K 5/01 119/61.5 |
| 6,209,487 B1 * | 4/2001 | Quinlan | ............... | A01K 5/0114 119/51.01 |
| 6,427,626 B1 * | 8/2002 | Quinlan | ............... | A01K 5/0114 119/51.01 |
| 6,786,177 B1 * | 9/2004 | Lemkin | ................ | A01K 5/0114 119/51.01 |
| 7,392,761 B2 * | 7/2008 | Kujawa | .................... | A01K 7/00 119/61.5 |
| 7,913,648 B2 * | 3/2011 | Maeda | ................... | A01K 7/027 119/51.5 |
| 8,453,602 B2 * | 6/2013 | Fairbanks | ............ | A01K 5/0128 119/61.5 |
| 8,464,658 B2 * | 6/2013 | Lanter | .................. | A01K 5/0114 119/61.52 |
| 9,339,007 B2 * | 5/2016 | Roth | ........................ | A01K 5/00 |

(Continued)

*Primary Examiner* — Yvonne R Abbott-Lewis
(74) *Attorney, Agent, or Firm* — John D. Gugliotta

(57) ABSTRACT

An animal feeder formed of a molded plastic base and a horizontally extending deck for receiving two or more water and food bowls, and legs or sidewalls secured to the deck for retaining same in an elevated position. Recesses are defined in the deck to receive a separate, molded storage container. The storage container forms wells store limited quantities of dry food, or treats, below each recess so that the food may be accessed by removing the bowl. The instant abstract is neither intended to define the invention disclosed in this specification nor intended to limit the scope of the invention in any way.

16 Claims, 3 Drawing Sheets

(56) References Cited

U.S. PATENT DOCUMENTS

2003/0192480 A1\* 10/2003 Bennett ................ A01K 5/0114
                                                                119/61.5
2004/0089583 A1\*  5/2004 Coleman .............. A01K 5/0114
                                                                206/561

\* cited by examiner

ANIMAL FEEDER WITH REMOVABLE STORAGE WELLS

RELATED APPLICATIONS

None.

BACKGROUND OF THE INVENTION

1. Field of the Invention

The present invention relates generally to animal feeders and, more particularly, to animal feeders with storage capability that can be added within the base of such animal feeders.

2. Description of the Related Art

Pet feeding and drinking dishes that provide for use in an elevated position exist in the marked. Generally used for larger pets, such elevated feeders are available from many sources. U.S. Pat. No. 6,209,487 shows an early example of pet feeding system in which an animal feeder provides food at an elevated position. The animal feeder embodying U.S. Pat. No. 6,209,487 has no provision made for the storage of food for the animal within the feeder. However, an improvement to the '487 patent is shown in U.S. Pat. No. 6,786,177 provides a sturdy, molded plastic base, and a horizontally extending deck for receiving two or more water and food bowls. Recesses are defined in the deck to receive the bowls. Wells are formed in the interior of the base, and communicate with the recesses. In the '177 device the wells are integrally molded within the plastic base and deck, and are used to store limited quantities of dry food, or treats, below each recess so that the food may be accessed by removing the bowl.

Both the '487 patent and the '177 patent are commonly owned by OurPet's Company, the assignee of the current application. While the improvements of the '177 patent are functionally advantageous over the base device of the '487 patent, the commercial advantages of providing molded-in storage wells beneath removable feeder bowls have proven to be more limited. The tooling and productions cost associated with the more complex "molded-in-storage-well" design, as well as a greater weight and a lesser "nesting" ability for storage/shipping have proven to make products embodying the '487 device more commercially successful.

As a result, a tremendous number of elevated pet feeders for use with removable bowls have been made, sold and used that do not have food containment storage areas formed beneath the removable bowls.

Consequently, a need has been felt for providing an apparatus that would allow non-storage capable elevated pet feeder devices to be converted for use with edible products storage wells.

SUMMARY OF THE INVENTION

It is therefore an object of the present invention to provide an improvement for elevated animal feeders.

It is an object of the present invention to provide edible material containment and storage capability in a manner that can be added within the base of pre-existing, nesting type elevated feeders.

Briefly described according to a preferred embodiment of the present invention, a molded storage container is provided for enabling the storage of food or other edible materials. The container is formed having an upper peripheral rim or flange type of extension circumscribing a wide upper opening. The container sidewall is vertical or slightly tapered such as to allow for the nesting of multiple such containers during shipping and storage throughout the supply chain from manufacturer to retailer. According to one aspect of the present invention, the storage container is adapted for use with a pre-existing pet feeding system of a design shown, taught or anticipated in the '487 reference. In such an aspect the container peripheral rim is sized such as to allow the container sidewall to pass through a recess of the feeder support structure while creating a support impingement that allows the rim or flange to matingly rest onto the top wall. A feeding vessel is thereby received by and retained onto the container and thereby seals a storage volume there beneath for containing edibles for storage. According to another aspect of the present invention, the storage container may be further adapted for use with other similar pre-existing pet feeding systems. In such an aspect, the wide upper opening, sidewall height, and flange or rim construction may be specifically selected for adaptation of use with a selected pre-existing feeding system. According to any aspect, the containers are formed to fit within the confines of an elevated feeder's base and receive a food or water bowl otherwise used with the elevated feeder.

An advantage of the present invention is that it allows for an elevated pet feeding system to include food or other storage beneath a supported food or water bowl.

Other advantages of the present invention is that such an adaptation to existing elevated pet feeding systems may be accomplished in an effective, efficient and convenient manner.

Further, a preferred embodiment of the present invention can be used in conjunction with existing elevated feeding systems, and can be adapted for use with various sized, shaped or configured elevated feeding systems.

Further features of the invention will become apparent in the course of the following description.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTION OF THE PREFERRED EMBODIMENTS

Figure 1:
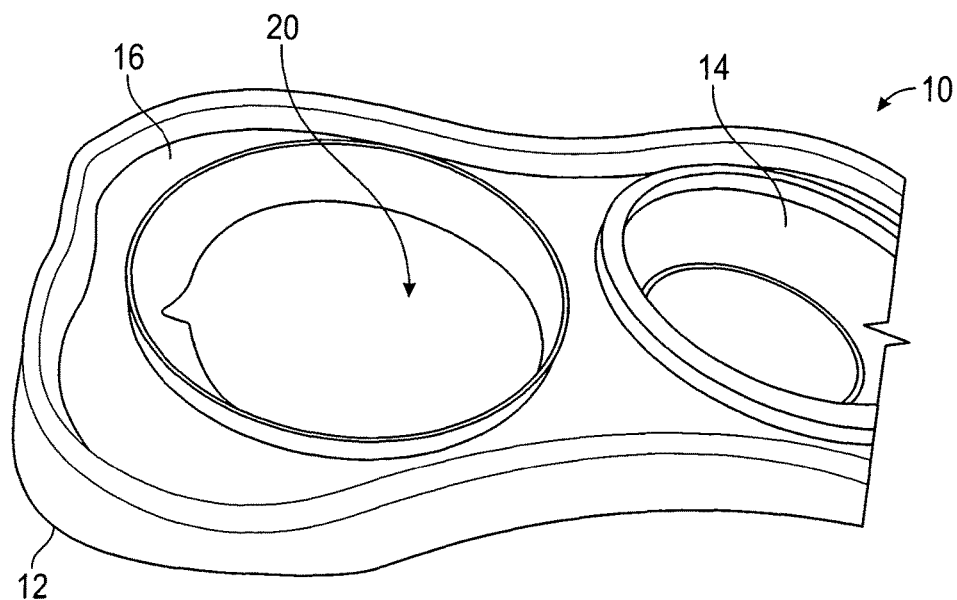
FIG. 1 is a photograph showing a top perspective view of a molded plastic animal feeder according to the PRIOR ART.

The best mode for carrying out the invention is presented in terms of its preferred embodiment, herein depicted within the Figures. As shown and described according to the preferred embodiment herein, a pet feeding system as shown in FIG. 1 is shown as taught, described and anticipated by U.S. Pat. No. 6,209,487. Such an improved elevated animal feeder apparatus 10 provides food at an elevated position to provide a more comfortable and healthy feeding position for animals. The animal feeder apparatus 10 includes a support structure 12 having removable feeder vessels 14. The support structure 12 is of a unitary molded plastic construction and is configured for nested stacking with like feeder assemblies for convenient and compact storage and handling. The base 16 of the top surface of the support structure is generally oblong in shape with flared side surfaces to provide support. The top surface 16 forms openings 20 for receiving feeding vessels 14. A more detailed description of such a feeder assembly 10 is provided in U.S. Pat. No. 6,209,487, which is incorporated by reference as if fully rewritten herein.

1. DETAILED DESCRIPTION OF THE FIGURES

Referring now to the FIG. 2 through FIG. 6, a molded storage container, generally noted as 100, is provided according to the preferred embodiment of the present invention. The storage container 100 provides for the storage of food or other edible materials (not shown). The container 100 is formed having an upper peripheral rim or flange 102 type of extension circumscribing a wide upper opening 104. A generally vertical container sidewall 106 circumscribes a container base 108 to form a containment volume 110. The sidewall 106 is vertical or, more preferably slightly outwardly tapered at an angle "a" from vertical such as to allow for the nesting of multiple such containers 100 during shipping and storage throughout the supply chain from manufacturer to retailer.

Figure 3:
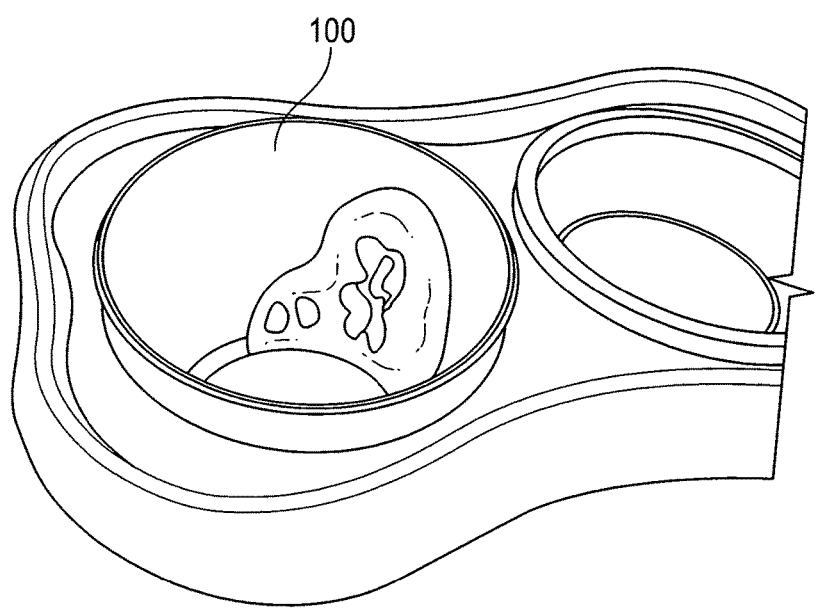
FIG. 3 is a photograph of a top perspective view of the removable storage well of the preferred embodiment of the present invention shown nested with receiving recess of and supported by the elevated platform of the molded plastic animal feeder of FIG. 1.

As shown best in conjunction with FIG. 3, the peripheral rim or flange 102 is radially extended outward to a size such as to create a support impingement that allows the rim or flange 102 to matingly rest onto the top wall 16. The container sidewall 106 to pass through the opening 20 of the feeder support platform 16

Once the container 100 is placed within the opening 20 of the feeder support platform 16, a feeding vessel 14 may subsequently be received by and retained onto the container 14. As shown best in conjunction with FIG. 4, such nesting of a bowl 14 over the opening 104 of the container 100 thereby seals the storage volume 110 for containing edibles for storage (not shown).

According to another aspect of the present invention, the storage container may be further adapted for use with other similar pre-existing pet feeding systems. In such an aspect, the wide upper opening, sidewall height, and flange or rim construction may be specifically selected for adaptation of use with a selected pre-existing feeding system. According to any aspect, the containers are formed to fit within a bowl receiving orifice of an elevated feeder that is normally provided for receiving a food or water bowl directly. With the container received into the elevated feeder, the pet food or water bowl may then be subsequently received into the container opening.

2. OPERATION OF THE PREFERRED EMBODIMENT

In operation according to one aspect of the present invention, the storage container is adapted for use with a pre-existing pet feeding system of a design shown, taught or anticipated in the '487 reference. In such an aspect the container peripheral rim is sized such as to allow the container sidewall to pass through a recess of the feeder support structure while creating a support impingement that allows the rim or flange to matingly rest onto the top wall. A feeding vessel is thereby received by and retained onto the container and thereby seals a storage volume there beneath for containing edibles for storage. According to another aspect of the present invention, the storage container may be further adapted for use with other similar pre-existing pet feeding systems. In such an aspect, the wide upper opening, sidewall height, and flange or rim construction may be specifically selected for adaptation of use with a selected pre-existing feeding system.

According to any aspect, the containers 100 are formed to fit within the confines of an elevated feeder's base and receive a food or water bowl otherwise used with the elevated feeder. Further, the container sidewalls are substantially cylindrical, or frustoconical, in shape, and are molded separately of and independently from the feeder 10.

Although provided separately, have a one-piece molded container that allows for the "nesting" together for minimizing of storage and handling requirements, as well as to "nest" with an existing feeder assembly, such a food storage container may be used in conjunction with newly provided elevated feeding systems or otherwise adapted for use with existing elevated feeding systems. Further, such separable use prevents interfering with any storage nesting that may be provided for or require with the elevated feeder platform. Such a feature is described as being especially desirous within the text of the related PRIOR ART.

Figure 2:
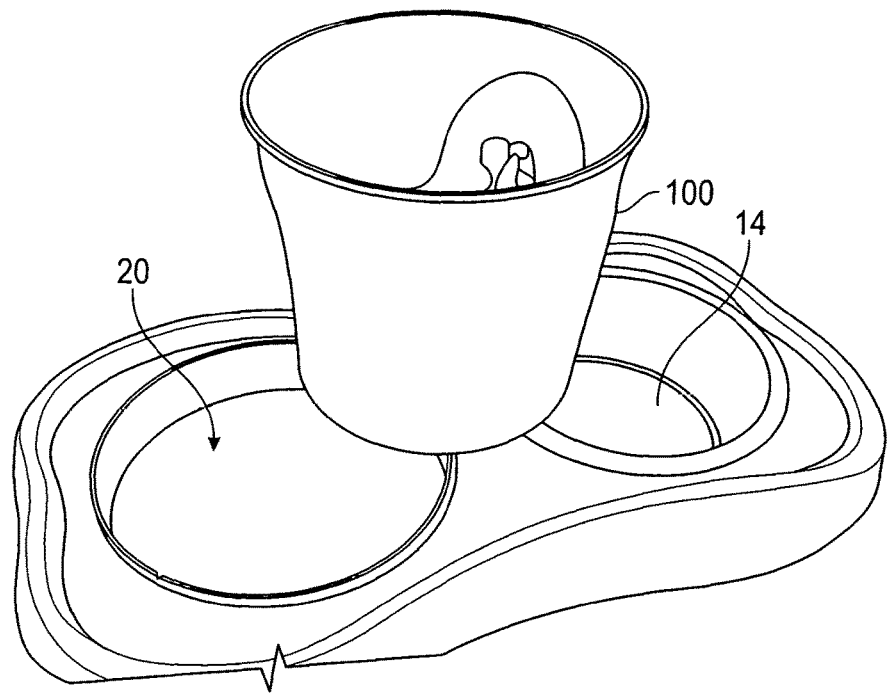
FIG. 2 is a photograph of a top perspective view of a removable storage well according to the preferred embodiment of the present invention for use with a molded plastic animal feeder of FIG. 1.
Figure 4:
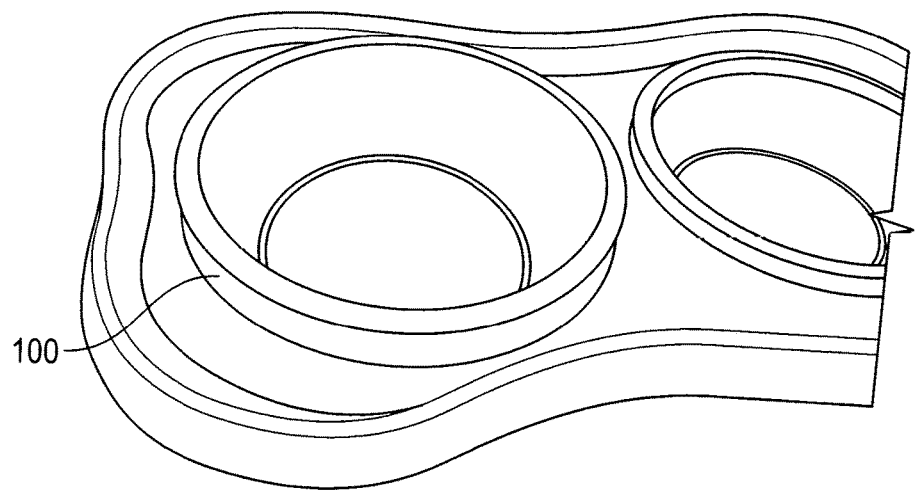
FIG. 4 is a photograph of a top perspective view of the inserted, nested storage well of FIG. 3 shown having a food or water bowl covering and sealing the storage well.
Figure 5:
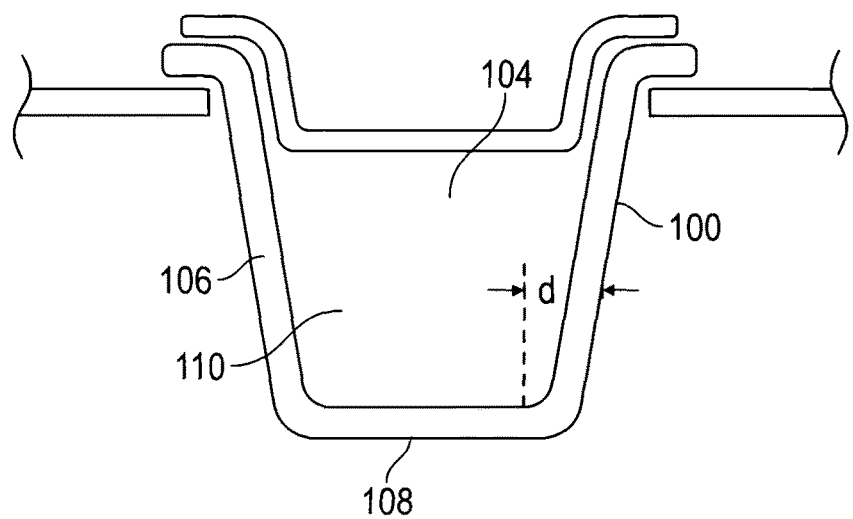
FIG. 5 is a side cross sectional view of the removable storage well of the preferred embodiment nested with receiving recess of and supported by the elevated platform of the molded plastic animal feeder of FIG. 1.
Figure 6:
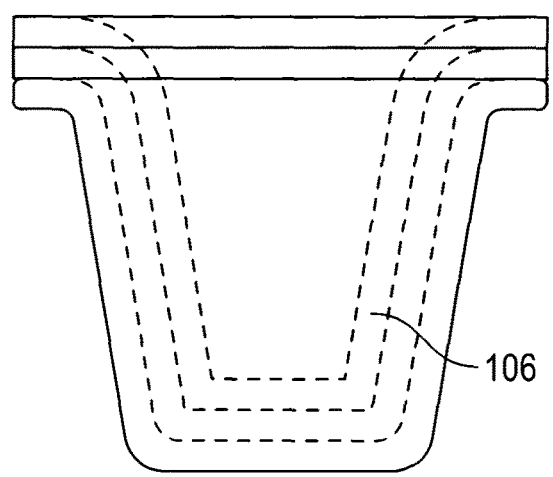
FIG. 6 is a side elevational view of a plurality of removable storage wells of FIG. 5 shown nested together.

The foregoing description of the preferred embodiment of FIGS. 2-4 should be construed in an illustrative manner, for other modifications of the wells for storing pet food, within the confines of an animal feeder, will occur to the skilled artisan. According to other aspect of the present invention, by way of example and not meant as a limitation, the storage container 100 may be further adapted for use with other similar pre-existing pet feeding systems such as to adapt the wide upper opening, sidewall height, and flange or rim construction to functionally interact specifically for use with such a selected pre-existing feeding system. Such adaptations should be understood, in light of the current teachings, to be formed to fit, inter alia, within the confines of an elevated feeder's base and receive a food or water bowl otherwise used with the elevated feeder.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is

Having thus described the invention what is claimed as new and desired to be secured by Letters Patent is as follows:

1. An elevated feeder apparatus comprising:
   (a) a feeding vessel;
   (b) a support structure having a top wall, said top wall forming at least one opening for receiving said feeding vessel accommodate an animal's paws so that the animal can position itself close to said apparatus during feeding; and
   (c) in combination, a separable storage container forming a containment volume for storing animal food located below said feeding vessel, said containment volume including an open upper circumscribed by an interference structure supported within said opening by said top wall and beneath said feeding vessel.

2. The elevated animal feeder apparatus of claim 1, wherein the support structure is of a first unitary molded plastic construction and said storage container is of a second unitary molded plastic construction.

3. The elevated animal feeder apparatus of claim 2, wherein said support structure is capable of nesting a first said feeder apparatus onto a second said feeder apparatus.

4. The elevated animal feeder apparatus of claim 3, wherein said support structure further comprises:
   flared side walls having a co-planar lower edge surface for resting on a flat surface, said flared side walls being configured and spaced apart sufficiently to clear the top wall of a subjacent animal feeder assembly of identical construction, to allow the animal feeder assembly to be stacked in nested relationship.

5. The elevated animal feeder apparatus of claim 2, wherein said separable storage container comprises:
   an upper peripheral rim or flange type of extension circumscribing a wide upper opening;
   a generally vertical container sidewall circumscribing a container base to form a containment volume, said sidewall having a slightly tapered at an angle from vertical such as to allow for the nesting of multiple such containers.

6. The elevated animal feeder apparatus of claim 1, wherein said support structure is capable of nesting a first said feeder apparatus onto a second said feeder apparatus.

7. The elevated animal feeder apparatus of claim 6, wherein said support structure further comprises:
   flared side walls having a co-planar lower edge surface for resting on a flat surface, said flared side walls being configured and spaced apart sufficiently to clear the top wall of a subjacent animal feeder assembly of identical construction, to allow the animal feeder assembly to be stacked in nested relationship.

8. The elevated animal feeder apparatus of claim 6, wherein said separable storage container comprises:
   an upper peripheral rim or flange type of extension circumscribing a wide upper opening;
   a generally vertical container sidewall circumscribing a container base to form a containment volume, said sidewall having a slightly tapered at an angle from vertical such as to allow for the nesting of multiple such containers.

9. The elevated animal feeder apparatus of claim 1, wherein said separable storage container comprises:
   an upper peripheral rim or flange type of extension circumscribing a wide upper opening;
   a generally vertical container sidewall circumscribing a container base to form a containment volume, said sidewall having a slightly tapered at an angle from vertical such as to allow for the nesting of multiple such containers.

10. In an animal feeder having a horizontally extending deck, a vertically extending support for retaining said deck in an elevated position parallel to, and spaced from, a supporting surface, at least one recess formed in said deck, said recess being sized to receive a feeding bowl therein, the improvement comprising:
    a container for use in combination with said animal feeder, said container forming a well for storing animal food located below said recess, said well including an open upper end in complete communication with said recess, said well further including a side wall and a bottom wall for enclosing same, said bottom wall being parallel to, but spaced from, said deck and the supporting surface, said open upper end receiving and supporting said feeding bowl.

11. In the improvement of claim 10, said container comprising:
    an upper peripheral rim or flange type of extension circumscribing said open upper end;
    a generally vertical container sidewall depending from said upper peripheral rim or flange type extension, said sidewall further circumscribes a container base to form a containment volume, said sidewall further being slightly tapered from vertical such as to allow for the nesting of multiple such containers; wherein said peripheral rim or flange is radially extended outward to a size such as to create a support impingement that allows the rim or flange to matingly rest onto the top wall while allowing said container sidewall to pass through the opening of the feeder support platform.

12. In the improvement of claim 11, wherein said vertically extending support is capable of nesting a first said feeder apparatus onto a second said feeder apparatus.

13. The improvement of claim 12, wherein said vertically extending support further comprises:
    flared side walls having a co-planar lower edge surface for resting on a flat surface, said flared side walls being configured and spaced apart sufficiently to clear the top wall of a subjacent animal feeder assembly of identical construction, to allow the animal feeder assembly to be stacked in nested relationship.

14. In the improvement of claim 10, wherein the vertically extending support is of a first unitary molded plastic construction and said container is of a second unitary molded plastic construction.

15. In the improvement of claim 10, wherein said vertically extending support is capable of nesting a first said feeder apparatus onto a second said feeder apparatus.

16. A pet food storage well comprising:
    a molded storage container formed having an upper peripheral rim or flange type of extension circumscribing a wide upper opening;
    a generally vertical container sidewall circumscribing a container base to form a containment volume;
    said sidewall slightly tapered at an angle such as to allow for the nesting of multiple such containers;
    said extension radially extended outward to a size such as to create a support impingement that allows support on a feeder support platform of an elevated feeding system;

said upper opening sized such as to receive a food or water bowl such as to close said containment volume.

* * * * *